US012808730B2

(12) United States Patent
Salazar et al.

(10) Patent No.: US 12,808,730 B2
(45) Date of Patent: Nov. 24, 2026

(54) FIBER OPTIC QUENCH DETECTION

(71) Applicant: Massachusetts Institute of Technology, Cambridge, MA (US)

(72) Inventors: Erica Salazar, Somerville, MA (US); Zachary Hartwig, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 274 days.

(21) Appl. No.: 18/681,295

(22) PCT Filed: Aug. 5, 2022

(86) PCT No.: PCT/US2022/039565
§ 371 (c)(1),
(2) Date: Feb. 5, 2024

(87) PCT Pub. No.: WO2023/014965
PCT Pub. Date: Feb. 9, 2023

(65) Prior Publication Data

US 2024/0337541 A1 Oct. 10, 2024

Related U.S. Application Data

(60) Provisional application No. 63/230,302, filed on Aug. 6, 2021.

(51) Int. Cl.
*G01K 11/3206* (2021.01)
*G01K 13/00* (2021.01)

(52) U.S. Cl.
CPC ........ *G01K 11/3206* (2013.01); *G01K 13/006* (2013.01)

(58) Field of Classification Search
CPC .... G01K 11/3206; G01K 13/006; G01K 1/14; G01K 2203/00; Y02E 40/60
See application file for complete search history.

(56) References Cited

U.S. PATENT DOCUMENTS 9,488,606 B2 * 11/2016 Omichi .................... G01K 1/14
11,101,059 B2 8/2021 Slade et al.
(Continued)

FOREIGN PATENT DOCUMENTS

CN 112368554 A * 2/2021 ............. G01B 11/18
CN 112834071 5/2021
(Continued)

OTHER PUBLICATIONS

"New High-Temperature Superconductor (HTS) Cable Demonstrates High Performance", Commonwealth Fusion Systems, https://cfs.energy/news-and-media/new-high-temperature-superconductor-hts-cable-demonstrates, Oct. 7, 2020; 4 pages.
(Continued)

*Primary Examiner* — John E Breene
*Assistant Examiner* — Manuel Salvador Castellon, Jr.
(74) *Attorney, Agent, or Firm* — Daly, Crowley, Mofford & Durkee, LLP

(57) ABSTRACT

A high temperature superconductor (HTS) cable includes at least one HTS tape stack extending along a length of the HTS cable; and at least one optical fiber extending along the HTS cable. The at least one optical fiber has a plurality of gratings spaced apart from one another along the length of the HTS cable to detect a quench of the at least one HTS tape stack.

20 Claims, 11 Drawing Sheets

(56) References Cited

U.S. PATENT DOCUMENTS

| | | | | |
|---|---|---|---|---|
| 11,190,006 | B2 | 11/2021 | Noonan et al. | |
| 11,557,893 | B2 | 1/2023 | Ross et al. | |
| 11,749,434 | B2 | 9/2023 | Slade et al. | |
| 11,776,721 | B2 | 10/2023 | Slade | |
| 2016/0047763 | A1 | 2/2016 | Omichi et al. | |
| 2017/0179364 | A1* | 6/2017 | Schwartz | H10N 60/80 |
| 2018/0248357 | A1 | 8/2018 | Ross et al. | |
| 2021/0215555 | A1 | 7/2021 | Badcock et al. | |

FOREIGN PATENT DOCUMENTS

| | | | | |
|---|---|---|---|---|
| WO | WO 2011/129245 | | 10/2011 | |
| WO | WO-2011129245 | A1 * | 10/2011 | H01F 7/06 |
| WO | WO2012/002016 | | 1/2012 | |
| WO | WO 2019/027964 | | 2/2019 | |
| WO | WO-2019027964 | A1 * | 2/2019 | H01B 12/02 |

OTHER PUBLICATIONS

Voluntary Amendment filed on Jul. 31, 2025, in Japanese Application No. 2024-506557 with English Translation; 8 Pages.
Voluntary Amendment filed on Aug. 4, 2025, in Korean Application No. 10-2024-7005948 with English Translation; 8 Pages.
European Communication pursuant to Rule 112(1) dated Oct. 9, 2024 for European Patent Application No. 22762182.8; 3 pages.
Response to European Communication pursuant to Rule 112(1) dated Oct. 9, 2024 for European Patent Application No. 22762182.8; Response filed on Dec. 3, 2024; 34 pages.
PCT International Search Report and Written Opinion dated Jan. 4, 2023 for International Patent Application No. PCT/US2022/039565; 19 pages.
Hartwig et al., "VIPER: an industrially scalable high-current high-temperature superconductor cable", Superconductor Science and Technology, IOP Publishing, vol. 33, No. 11; Oct. 7, 2020; 9 pages.
Salazar et al., "Fiber optic quench detection for large-scale HTS magnets demonstrated on VIPER cable during high-fidelity testing at the Sultan facility", Superconductor Science and Technology, IOP Publishing, vol. 34; Feb. 4, 2021; 19 pages.
Van der Laan et al., "CORC wires containing integrated optical fibers for temperature and strain monitoring and voltage wires for reliable quench detection", Superconductor Science and Technology, IOP Publishing, vol. 33; Jul. 7, 2020; 23 pages.
Luo et al., "Distributed fiber optic sensing to identify locations of resistive transitions in Rebco conductors and magnets" Presentation, IEEE Transactions on Applied Superconductivity, vol. 32, No. 6; Sep. 2022; 1 page.
Luo et al., "Distributed fiber optic sensing to identify locations of resistive transitions in REBCO conductors and magnets", IEEE Transactions on Applied Superconductivity, vol. 32, No. 6; Sep. 2022; 6 pages.
Liu et al., "Feasibility Study of Fiber Bragg Grating Sensor for Quench Detection of High Temperature Superconductors". IEEE Transactions on Applied Superconductivity, vol. 29, No. 5, Aug. 2019; 6 pages.
Hunte et al., "Fiber Bragg Optical Sensors for YBCO Applications", Particle Accelerator Conference, Canada, May 4-8, 2009, 3 pages.
Pourrahimi et al., "Performance of the US Quench Detection Systems in the QUELL Experiments", IEEE Transactions on Applied Superconductivity, vol. 7, No. 2, Jun. 1997; 4 pages.
Scurti et al., "Quench Detection for high temperature superconductor magnets: a novel technique based on Rayleigh-backscattering interrogated optical fibers", Superconductor Science and Technology, IOP Publishing, vol. 29, Jan. 22, 2016; 9 pages.
Pourrahimi et al., "US Contributions to the Development and Calibration of Quench Detectors for the ITER QUELL", IEEE Transactions on Applied Superconductivity, vol. 5, No. 2, Jun. 1995; 4 pages.
Schultz et al., "Principles of Advanced Quench Detection Designs in Cable-In-Conduit (CICC) Magnets", IEEE Transactions on Applied Superconductivity, vol. 7, No. 2, Jun. 1997; 6 pages.
Examination Report dated Jul. 2, 2026, for European Application No. 22762182.8; 6 Pages.
Korean Office Action (With English Translation) dated May 13, 2026, for Application No. 10-2024-7005948; 15 Pages.

* cited by examiner

FIBER OPTIC QUENCH DETECTION

CROSS REFERENCE TO RELATED APPLICATIONS

This application is a 371 U.S. National Stage application of International Patent Application PCT/US2022/039565 filed in the English language on Aug. 5, 2022, and entitled Fiber Optic Quench Detection which claims the benefit of U.S. Provisional Application No. 63/230,302, filed on Aug. 6, 2021.

STATEMENT REGARDING FEDERALLY SPONSORED RESEARCH

Not applicable.

BACKGROUND

Superconductors are materials that have no electrical resistance to current (are "superconducting") below a critical temperature. For many superconductors, the critical temperature is below 30 K, such that operation of these materials in a superconducting state is performed using significant cooling, as may be achieved with liquid helium or supercritical helium.

SUMMARY

Some embodiments are directed to a high temperature superconductor (HTS) cable. The HTS cable comprises at least one HTS tape stack extending along a length of the HTS cable; and at least one optical fiber extending along the HTS cable, the at least one optical fiber having a plurality of gratings spaced apart from one another along the length of the HTS cable to detect a quench of the at least one HTS tape stack.

In some embodiments, the HTS cable comprises a jacket around the at least one HTS tape stack. In some embodiments, the jacket comprises copper.

In some embodiments, the HTS cable further comprises at least one groove in the jacket, wherein the at least one optical fiber is disposed within the at least one groove. In some embodiments, the at least one groove is at an exterior surface of the jacket. In some embodiments, the HTS cable further comprises an adhesive in the at least one groove, securing the at least one optical fiber in the at least one groove.

In some embodiments, the HTS cable further comprises a former, wherein the at least one HTS tape stack is within a groove in the former. In some embodiments, the former comprises copper.

In some embodiments, the plurality of gratings are fiber Bragg gratings.

In some embodiments, gratings of the plurality of gratings are spaced apart from one another by a distance suitable for detecting quench within a short enough time period that current within the HTS cable can be reduced before damage to the HTS cable occurs.

Some embodiments are directed to a cable, comprising: a former having an opening extending along a length thereof and configured to accept an HTS material; HTS material disposed in at least a portion of the opening in the former; and an optical fiber disposed about the former and extending along a length of the former proximate at least a portion of the HTS material, the optical fiber having a plurality of gratings spaced apart from one another along a length of the former.

In some embodiments, the opening in the former is provided as a channel extending along a length of the former in an exterior surface of the former; and the HTS material is provided as an HTS tape stack disposed in at least a portion of the channel.

In some embodiments, the cable further comprises a conductor disposed about at least a portion of the HTS tape stack. In some embodiments, the conductor comprises copper. In some embodiments, the conductor is provided having at least one groove provided therein and the optical fiber is disposed in the at least one groove.

In some embodiments, the opening in the former is a first one of a plurality of openings in the former, with each opening extending along a length of the former and configured to accept an HTS material; HTS material is disposed in at least portions of the plurality of openings in the former; and the optical fiber is a first one of a plurality of optical fibers disposed about the former and extending along a length of the former proximate at least a portion of the HTS material, with each of the plurality of optical fibers having a plurality of gratings spaced apart from one another along a length of the former.

In some embodiments, the openings in the former are provided as channels extending along a length of the former in an exterior surface of the former; and the HTS material is provided as an HTS tape stack disposed in at least a portion of the channels.

In some embodiments, the cable further comprises a conductor disposed about at least a portion of the HTS tape stack. In some embodiments, the conductor comprises copper.

In some embodiments, the cable further comprises at least one optical fiber groove in the conductor, wherein the at least one of the plurality of optical fiber is disposed in the optical fiber groove.

In some embodiments, the conductor further comprises at least one optical fiber groove; and at least one optical fiber is disposed within the at least one optical fiber groove.

In some embodiments, the conductor is provided having a plurality of optical fiber grooves; and at least one optical fiber is disposed in each of the plurality of optical fiber grooves.

In some embodiments, the cable further comprises an adhesive in the plurality of optical fiber grooves to secure an optical fiber.

In some embodiments, the plurality of gratings are fiber Bragg gratings.

In some embodiments, the plurality of gratings are spaced apart from one another by a distance suitable for detecting quench within a short enough time period that current within the cable can be reduced before damage to the cable occurs.

In some embodiments, the cable is used in at least one of a fusion energy system, a magnetic resonance imaging system, a nuclear magnetic resonance system, a motor; a power transmission system; or a particle accelerator.

Some embodiments are directed to a cable comprising: HTS material extending along a length of the cable; and a plurality of optical fibers extending along a length of the cable, at least some of the plurality of optical fibers proximate the HTS material and at least some of the plurality of optical fibers having a plurality of gratings spaced apart from one another along a length thereof.

In some embodiments, the cable further comprises a conductor disposed thereover and the plurality of optical fibers are embedded in the conductor. In some embodiments, the conductor is provided having a plurality of grooves and respective ones of the plurality of optical fibers are disposed in respective ones of the grooves.

In some embodiments, the cable is used in at least one of a fusion energy system, a magnetic resonance imaging system, a nuclear magnetic resonance system, a motor; a power transmission system; or a particle accelerator.

In some embodiments, the plurality of gratings are spaced apart from one another by a distance suitable for detecting quench within a short enough time period that current within the cable can be reduced before damage to the cable occurs.

In some embodiments, the HTS material comprises at least on HTS tape stack.

In some embodiments, the plurality of gratings in the plurality of optical fibers are spaced apart from one another along the length of the cable to detect a quench of the HTS material.

In some embodiments, the plurality of gratings are fiber Bragg gratings.

Some embodiments are directed to a cable comprising: a plurality of HTS components; a plurality of electrically conductive segments extending along the cable, each of the plurality of electrically conductive segments comprising one of the plurality of HTS components; an electrically insulating material arranged between adjacent electrically conductive segments of the plurality of electrically conductive segments that electrically insulates the plurality of electrically conductive segments from one another; and at least one optical fiber extending along a length of the cable, the at least one optical fiber having a plurality of gratings spaced apart from one another along the length of the at least one optical fiber to detect a quench event in the cable.

In some embodiments, the at least one optical fiber is disposed in one of the plurality of electrically conductive segments.

In some embodiments, the at least one optical fiber is disposed in two or more of the plurality of electrically conductive segments.

In some embodiments, the at least one optical fiber is disposed in each of the plurality of electrically conductive segments.

In some embodiments, the at least one optical fiber comprises a plurality of optical fibers disposed in one of the plurality of electrically conductive segments.

In some embodiments, the at least one optical fiber comprises a plurality one optical fibers; and two or more of the plurality of electrically conductive segments comprise at least two optical fibers.

In some embodiments, the at least one optical fiber comprises a plurality one optical fibers and a plurality of optical fibers are disposed in each of the plurality of electrically conductive segments.

In some embodiments, the cable further comprises a conductor disposed over the plurality of electrically conductive segments wherein the at least one optical fibers are embedded in the conductor.

In some embodiments, the at least one optical fiber corresponds to a plurality of optical fibers; the cable is provided having a like plurality of grooves; and respective ones of the plurality of optical fibers are disposed in respective ones of the plurality of the grooves.

In some embodiments, the cable is used in at least one of a fusion energy system, a magnetic resonance imaging system, a nuclear magnetic resonance system, a motor, a power transmission system, and/or a particle accelerator.

Some embodiments are directed to a quench detection system for an HTS cable having at least one HTS tape stack extending along a length of the HTS cable. The quench detection system comprises: at least one optical fiber extending along the HTS cable, the at least one optical fiber having a plurality of gratings spaced apart from one another along the length of the HTS cable to detect a quench of the at least one HTS tape stack; a light source configured to illuminate the at least one optical fiber; an optical detector configured to detect light from the optical fiber; and circuitry configured to sense a temperature at one or more of the plurality of gratings using the light detected by the optical detector.

Some embodiments are directed to a quench detection system for a high temperature superconductor (HTS) cable having at least one HTS tape stack extending along a length of the HTS cable, the quench detection system comprising: at least one optical fiber extending along the HTS cable, the at least one optical fiber having a plurality of gratings spaced apart from one another along the length of the least one optical fiber; a light source configured to illuminate the at least one optical fiber; an optical detector configured to detect light from the at least one optical fiber; and circuitry configured to sense a temperature at one or more of the plurality of gratings using light detected by the optical detector.

In some embodiments, the quench detection system is used in at least one of a fusion energy system, a magnetic resonance imaging system, a nuclear magnetic resonance system, a motor; a power transmission system; or a particle accelerator.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
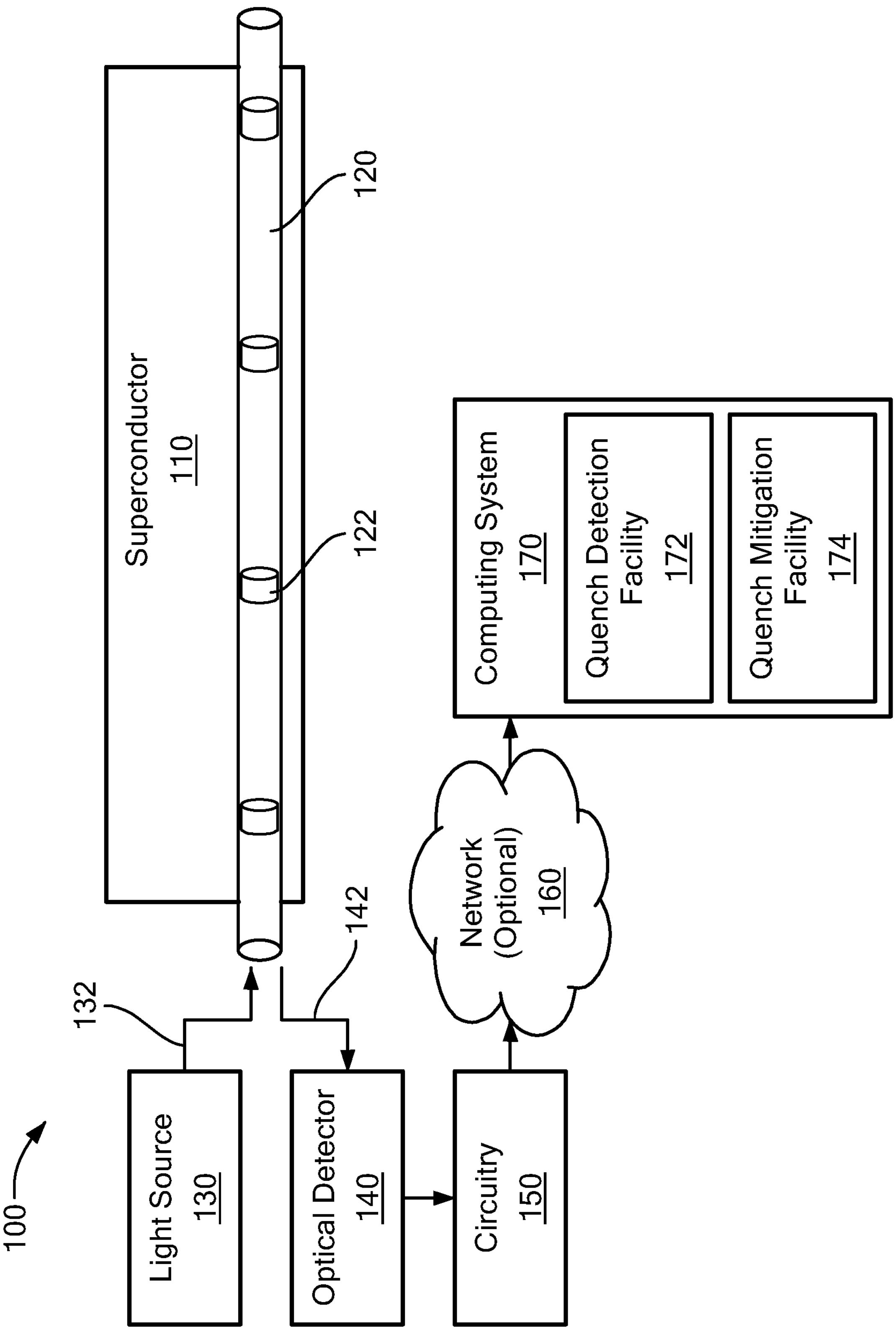
FIG. 1 is a schematic diagram of a system for detecting a quench event in a superconducting material, in accordance with some embodiments described herein.

Described herein are techniques for optically detecting a quench event in a superconductor. These techniques include using fiber optic thermometry to detect a change in temperature in a superconductor indicative of a quench event. The superconductor may be a high temperature superconductor (HTS) cable including HTS material and one or more optical fibers extending along the length of the HTS cable. The optical fibers may include a plurality of Bragg gratings arranged along the length of the optical fibers. A light source may illuminate the optical fibers, and an optical detector may detect reflected or transmitted light from the optical fibers. Based on the spectra of the detected light, a change in temperature at the location(s) of one or more of the Bragg gratings may be determined.

Superconductors are materials that have no electrical resistance to current (are "superconducting") below a critical temperature. Superconductors include low temperature superconductors (LTS), which have critical temperatures typically below 30 K and are cooled using liquid helium, and high temperature superconductors (HTS), which can have critical temperatures greater than 77 K and are cooled using liquid nitrogen. Both LTS and HTS materials have found applications in fusion energy, high-efficiency motors, high-efficiency power transmission, magnetic resonance imaging (MRI), nuclear magnetic resonance (NMR), and high-field particle accelerators.

To remain in a superconducting state, the superconducting material must remain at a temperature below the critical temperature. However, localized energy dissipation (e.g., due to current flow in the superconductor) can cause localized heating, which, if not controlled or detected, may result in a thermal runaway event that causes the entire superconductor to transition (to "quench") from the superconducting regime to a normal, resistive regime. A quench event not only can result in downtime of the superconducting device but may result in damage to the superconducting device as well.

In order to mitigate the risk of a quench, quench detection and protection systems are used to detect a quench event quickly and to prevent or mitigate damage by removing all of the current and stored energy from the superconductor. Conventional quench detection systems typically rely on the detection of localized voltage rises within a superconductor. However, these voltage-based quench detection systems can be impacted by noise caused by electromagnetic induction, yielding false positives and unnecessary dumping of the energy stored from the superconductor, which may increase downtime of the device and/or risk damaging the device. The electromagnetic sensitivity of voltage-based quench detection systems makes them particularly challenging in environments experiencing frequent electromagnetic interference. One example of such an environment is a tokamak fusion environment, where there are frequent and large voltage signals generated by the surrounding magnets and plasma that may interfere with voltage-based quench detection systems. Additionally, voltage-based quench detection systems require multiple voltage taps, which pass through high-voltage insulation, to make contact with the superconductor. Each voltage tap therefore introduces a break in the electrical insulation of the superconductor, which increases the risk of an adverse electrical event (e.g., arcing, shorting).

The inventors have recognized and appreciated that optical systems are not susceptible to electromagnetic interference and may be used to develop more robust and accurate optics-based quench detection systems. Such optics-based quench detection systems may use fiber optic thermometry, which measures the temperature and strain response of optical fibers, to detect quench events by embedding the fiber optic cable in or adjacent the superconductor. The optical fibers used in such optics-based quench detection systems may include a number of Bragg gratings (e.g., fiber Bragg gratings (FBGs), ultra-long fiber Bragg gratings (ULFBGs)) which are configured to reflect a portion of any light that is incident on the Bragg gratings. The spectra of the reflected light may indicate a change in temperature and/or strain experienced by the Bragg gratings such that a quench event can be detected by analyzing the spectra of reflected light.

Accordingly, the inventors have developed cables including superconducting materials and at least one optical fiber. In some embodiments, the superconducting materials include a HTS material extending along a length of the cable. In some embodiments, the HTS material may be disposed in at least one HTS tape stack extending along the length of the cable. The HTS tape stack may include segments of the HTS material and an electrically insulating material arranged between adjacent HTS segments in order to electrically insulate the HTS segments from one another.

In some embodiments, the cable may include a former having an opening extending along the length of the cable. The HTS material may be disposed in at least a portion of the opening in the former. For example, an HTS tape stack as described herein may be disposed in at least a portion of the opening in the former.

In some embodiments, the cable may further include one or more optical fibers extending along the length of the cable. The optical fibers may include a plurality of gratings spaced apart from one another along the length of the cable. The optical fibers may be configured to detect a quench of the superconducting material in the cable. In some embodiments, the optical fibers may be disposed proximate the HTS material. In some embodiments, the optical fibers may be disposed about the former.

The inventors have additionally developed a quench detection system for detecting a quench event in a superconducting material. In some embodiments, the superconducting material is a HTS cable including at least one HTS tape stack extending along a length of the HTS cable. In some embodiments, the quench detection system includes at least one optical fiber extending along the length of the superconducting material, the at least one optical fiber including gratings (e.g., FBGs, ULFBGs) spaced apart from one another along the length of the superconductor.

In some embodiments, the quench detection system additionally includes a light source configured to illuminate the optical fiber, an optical detector configured to detect light from the optical fiber, and circuitry configured to sense a temperature at one or more of the gratings of the optical fiber using the light detected by the optical detector. In some embodiments, the light source, optical detector, and/or circuitry may be combined into a single device (e.g., disposed in a single housing).

Following below are more detailed descriptions of various concepts related to, and embodiments of, techniques for quench detection. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

FIG. 1 is a schematic diagram of a system 100 for detecting a quench event in a superconducting material, in accordance with some embodiments described herein. In the illustrative example of FIG. 1, the system 100 includes a superconductor 110, an optical fiber 120, a light source 130, an optical detector 140, circuitry 150, a network 160, and a computing system 170. It should be appreciated that system 100 is illustrative and that a quench detection system may have one or more other components of any suitable type in addition to or instead of the components illustrated in FIG. 1. For example, there may be additional computing systems (e.g., two or more) present within a quench detection system. As another example, in some embodiments, the light source 130, optical detector 140, and/or circuitry 150 may be combined into a single device (e.g., disposed in a single housing).

In some embodiments, the superconductor 110 may be any suitable superconducting material. For example, the superconductor 110 may include a LTS and/or a HTS material. In some embodiments, the superconductor 110 may be arranged to form a superconducting electromagnet and/or power transmission line, such as for use in motor, power transmission, MRI, NMR, particle accelerator, and/or fusion energy systems. In some embodiments, the superconductor 110 may include one or more HTS tape stacks, as described in more detail in connection with FIGS. 5A and 5B herein.

In some embodiments, the optical fiber 120 may be in thermal contact with the superconductor 110. For example, the optical fiber 120 may be disposed proximate the superconductor 110 and/or may be embedded in the superconductor 110. It should be appreciated that while the example of FIG. 1 shows a single optical fiber 120, aspects of the technology described herein are not limited in this respect. In some embodiments, there may be multiple optical fibers. For example, there may be a number of optical fibers in a range from 2 to 50, from 2 to 25, from 2 to 10, or from 2 to 7, or within any range within these ranges.

In some embodiments, the optical fiber 120 may include a number of gratings 122 disposed along the length of the optical fiber 120. The gratings may be diffraction gratings configured to reflect particular wavelengths of light and to transmit other wavelengths of light. For example, the gratings 122 may be fiber Bragg gratings (FBGs) or ultra-long fiber Bragg gratings (ULFBGs). The illustration of FIG. 1 shows four gratings 122 that are evenly spaced, but it should be appreciated that there may be greater than four gratings 122 that may be evenly spaced or non-evenly spaced, as aspects of the technology described herein are not limited as to the number of gratings 122 or their spacing. In some embodiments, the gratings 122 may be spaced by one or more distances suitable for detecting a quench event within a short enough time period that stored energy within the superconductor 110 can be removed prior to damaging the superconductor 110 or other components of the device housing the superconductor 110.

Figure 2A:
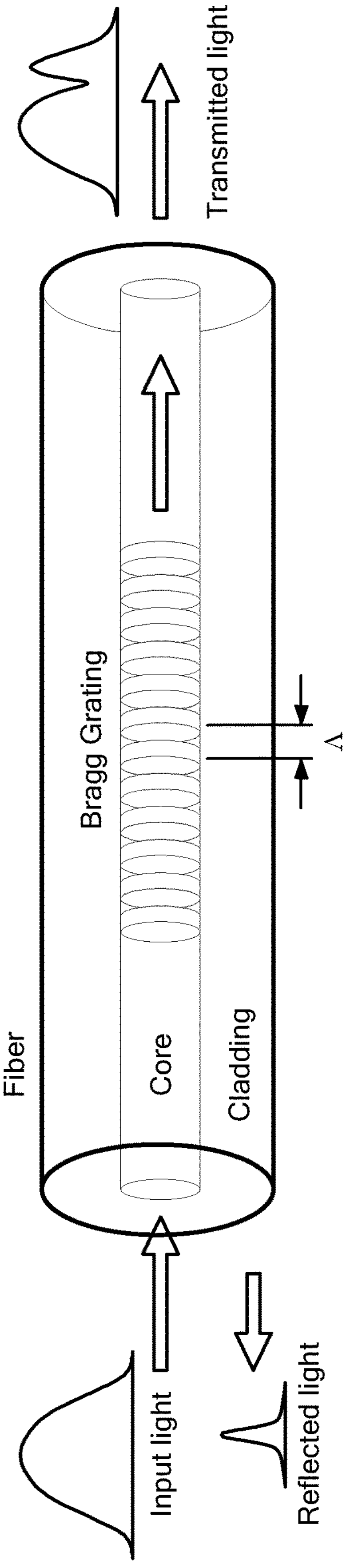
FIG. 2A is a schematic diagram of a fiber Bragg grating (FBG) in an optical fiber, in accordance with some embodiments described herein.

An illustrative example of an FBG is shown in FIG. 2A. The optical fiber includes a Bragg grating, which is a periodic modulation of the refractive index of the optical fiber core over a certain length of the optical fiber. When broadband light is emitted to a Bragg grating, the grating only reflects a specific wavelength component, $\lambda_B$. The reflected Bragg wavelength is given by:

$$\lambda_B=2\Lambda n_{eff}$$

where $n_{eff}$ is the effective refractive index of the core and Λ is the grating period in nanometers. The FBG is sensitive to both temperature and strain, and a change in these parameters leads to a shift in the Bragg wavelength due to the effect they induce on both the effective refractive index and the grating period.

Figure 2B:
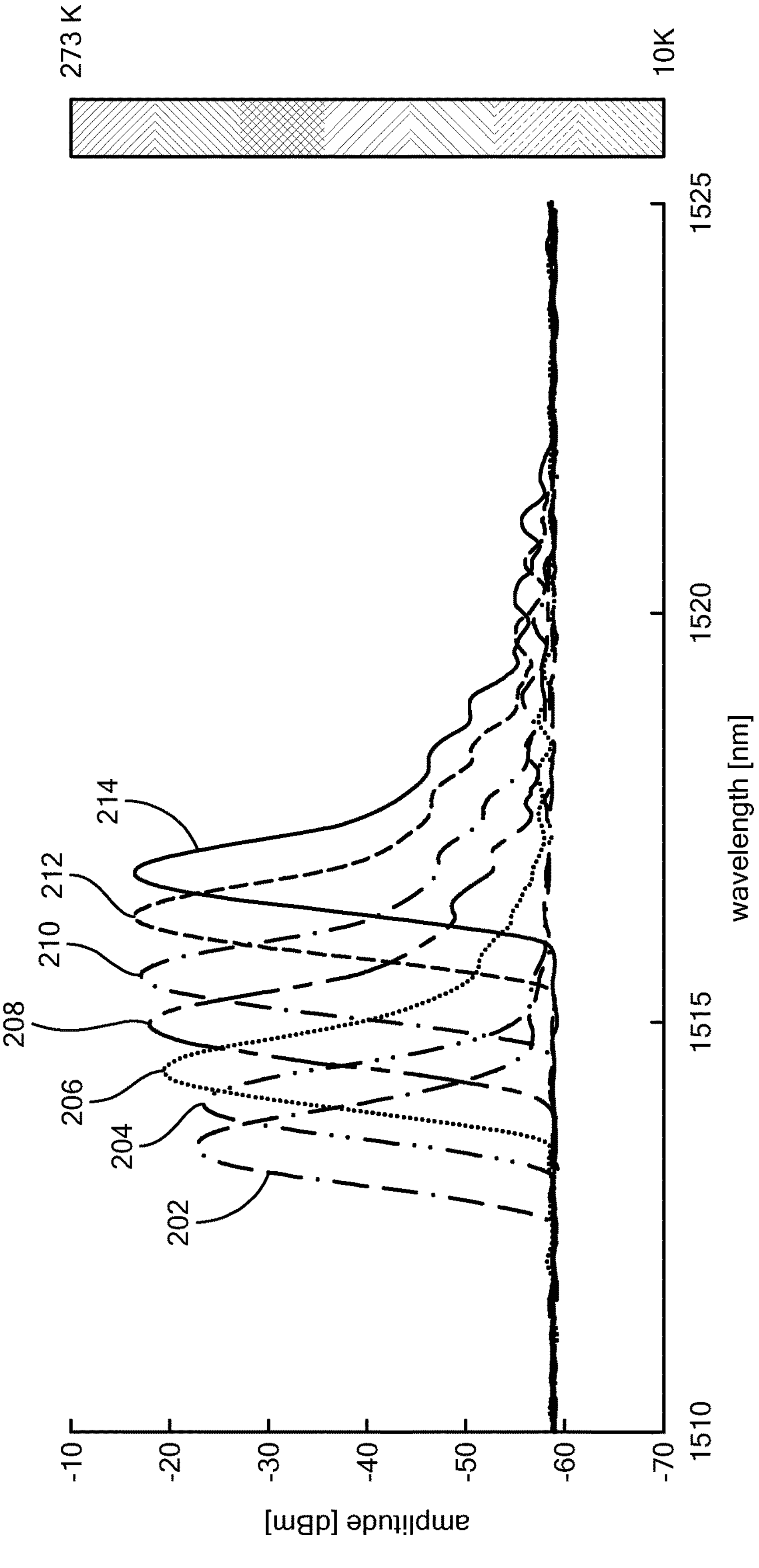
FIG. 2B is a plot illustrating a shift in wavelength of the light reflected off of an FBG as a function of temperature, in accordance with some embodiments described herein.

FIG. 2B is a plot illustrating of a shift in wavelength of the light reflected off of an FBG as a function of temperature, in accordance with some embodiments described herein. Curve 202 is the spectrum of reflected light from an optical fiber having FBGs at a temperature of approximately 10K, while curve 214 is the spectrum of reflected light from the optical fiber at a temperature of approximately 273K. Curves 204 through 212 are the spectra of reflected light of a single FBG at increasing temperatures between those of curves 202 and 214. As can be seen from FIG. 2B, the peak wavelength that is reflected by the FBGs of the optical fiber shifts in response to temperature from a longer value, as shown by curve 214, to a shorter value, as shown by curve 202.

In some embodiments, a large number of FBGs, or ULFBGs, may be arranged in the optical fiber 120. For example, the optical fiber 120 may include ULFBGs that include a series of 9-millimeter-long FBGs spaced with a 1 mm gap between gratings, such that the many FBGs act as one long FBG. Such ULFBGs can be used to monitor temperature changes over many meters of optical fiber length.

Figure 3A:
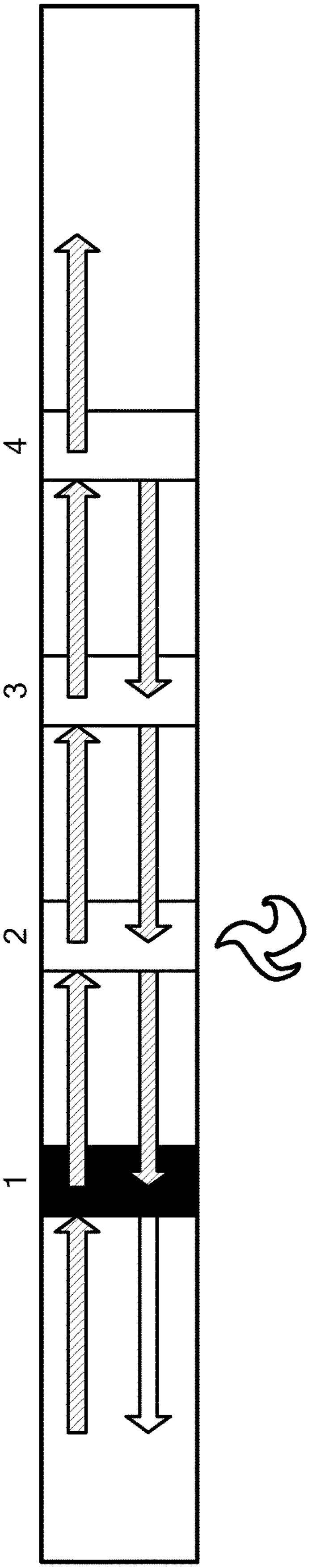
FIG. 3A is a schematic diagram of an optical fiber having multiple FBGs, in accordance with some embodiments described herein.

While the reflected spectrum for a single FBG exhibits a single peak, when combined into a ULFBG, the reflected spectra may exhibit more complex behavior. A simple example of an optical fiber including a ULFBG having multiple FBGs is shown in FIG. 3A. A portion of the light that is incident on FBG 1 is reflected and has a specific wavelength, $\lambda_1$. The rest of the light is transmitted through FBG 1 to FBG 2. At FBG 2, the temperature is elevated such that FBG 2 reflects a different specific wavelength of light, $\lambda_2\neq\lambda_1$, and transmits the rest of the light to FBG 3. FBG 3 has a lower temperature than FBG 2 and therefore reflects a third wavelength of light, $\lambda_3\neq\lambda_2\neq\lambda_1$. The result is that several wavelengths are reflected, possibly at different amplitudes. Thus, changes in temperature anywhere along the optical fiber result in at least two effects: (1) a change in the dominant reflected wavelength, which is a property of conventional single FBGs, and (2) a change in the overall shape of the reflected spectrum.

Figure 3B:
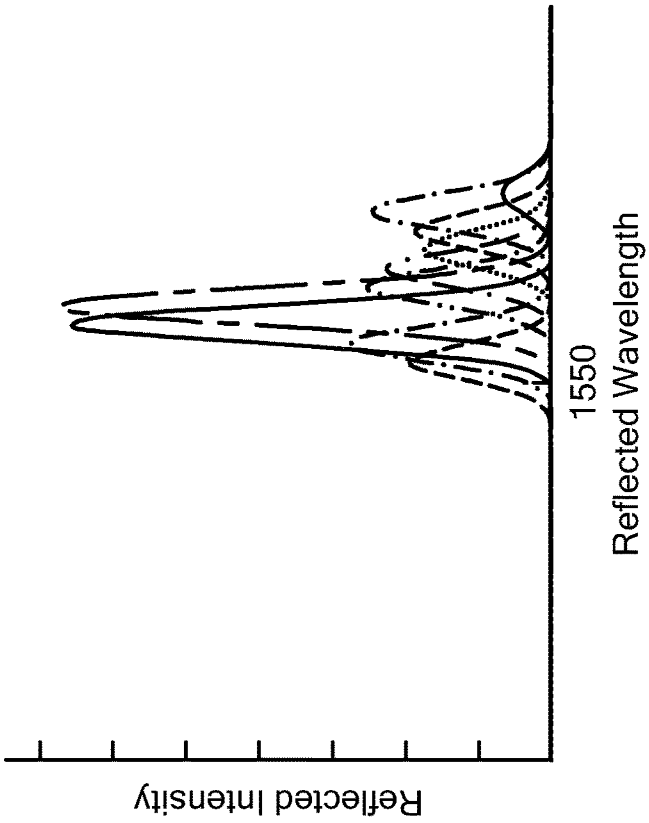
FIG. 3B is a plot illustrating the decomposed reflected spectra from an optical fiber having multiple FBGs, in accordance with some embodiments described herein.
Figure 3C:
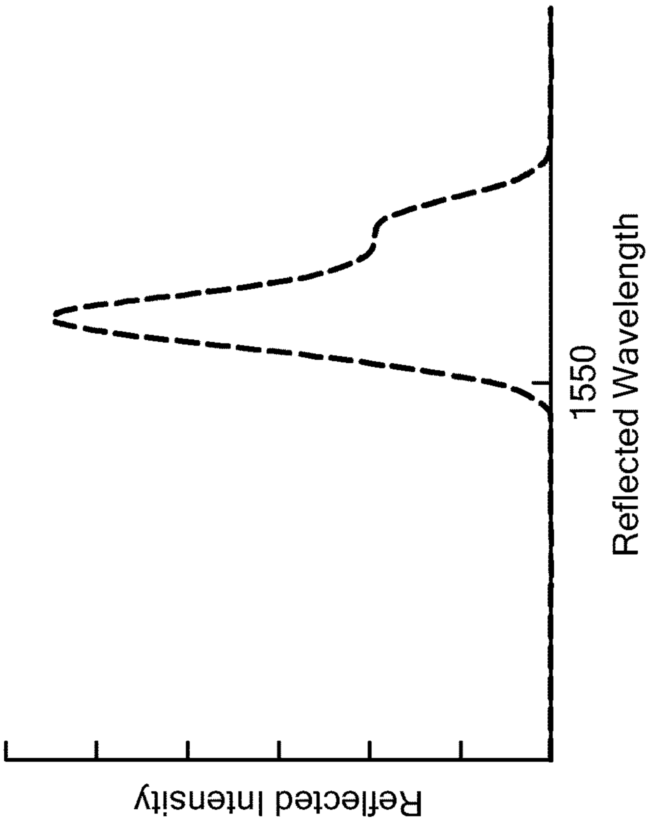
FIG. 3C is a plot illustrating a combined reflected spectrum from an optical fiber having multiple FBGs, in accordance with some embodiments described herein.

The individual reflections from a ULFBG, as graphically illustrated in FIG. 3B, may exhibit distinct peaks similar to conventional single FBGs, but the sum of these reflections may resemble a combined, indeterministic spectrum as shown in FIG. 3C. This occurs because the reflected spectrum of a ULFBG responds to all simultaneously occurring changes in temperature and strain along the optical fiber's length and results in rapid detection of temperature variation, irrespective of the location of the heat source along the optical fiber.

Figure 4A:
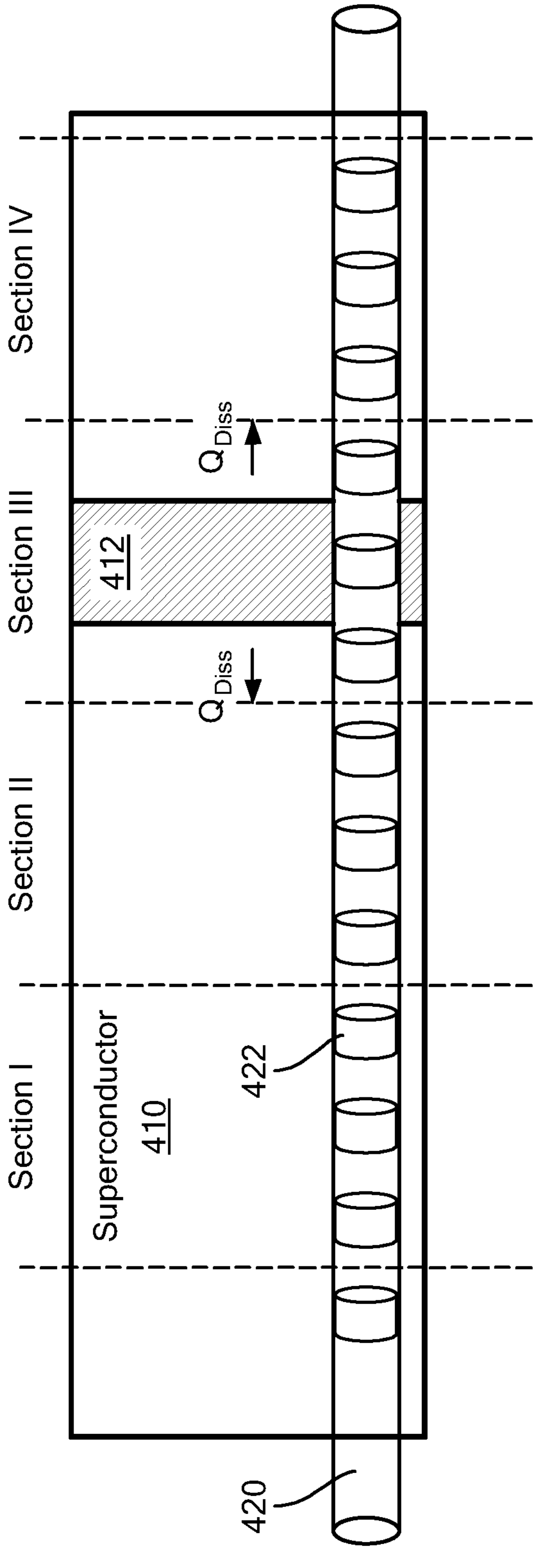
FIG. 4A is a schematic diagram of a high-temperature superconducting component including an optical fiber including an ULFBG, the high-temperature superconducting component experiencing a quench, in accordance with some embodiments described herein.
Figure 4B:
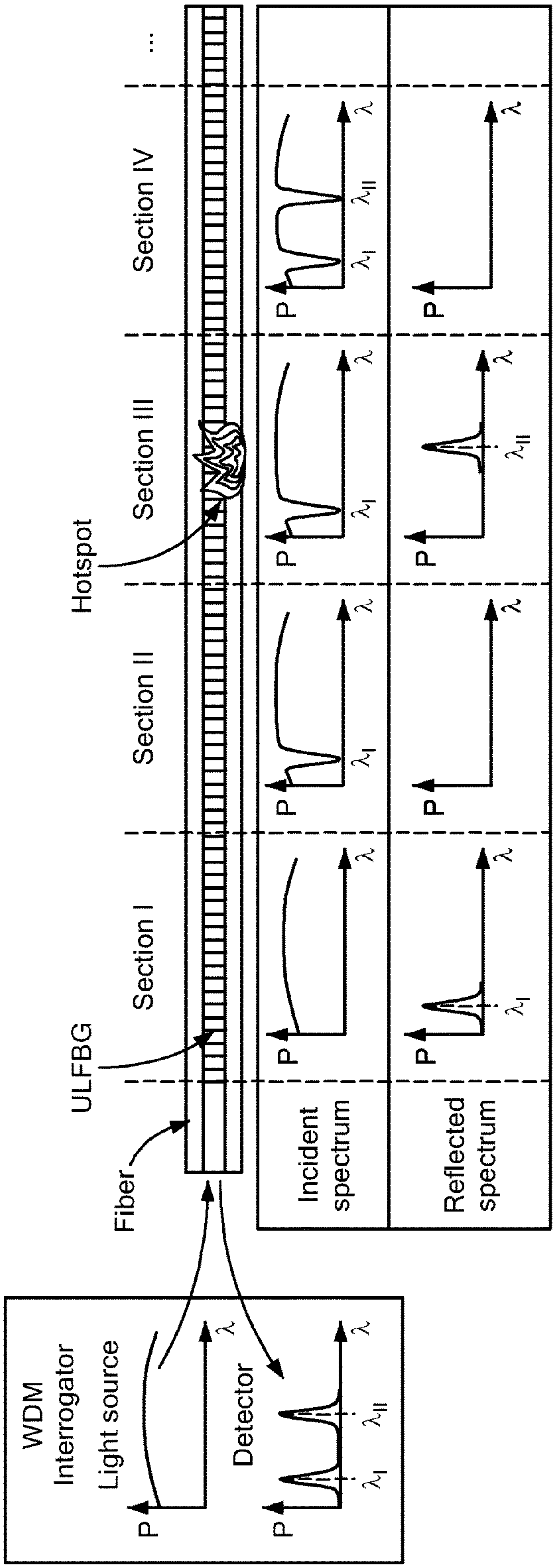
FIG. 4B shows incident and reflected spectra from FBGs disposed in different portions relative to the location of the quench in the high-temperature superconducting component of FIG. 3A, in accordance with some embodiments described herein.

Another example of the thermal response of an optical fiber having a ULFBG is shown in FIGS. 4A and 4B. FIG. 4A is a schematic diagram of a superconductor 410 and an optical fiber 420 including a ULFBG 422. The superconductor 410 is divided into sections I, II, III, and IV, and includes a hotspot 412 in section III in which the temperature of the superconductor 410 is elevated. Heat, $Q_{diss}$, dissipates away from the hotspot 412 into both sections II and IV.

FIG. 4B shows incident spectra (top row) and reflected spectra (bottom row) in each of sections I through IV of the optical fiber 420 of FIG. 4A. The original spectrum of the input light and the total reflected spectrum from the optical fiber 420 are shown at left. As shown in FIG. 4B, the ULFBG in section I reflects light with a wavelength of $\lambda_1$ and prevents light with the wavelength of $\lambda_1$ from being transmitted to section II. Because section II is approximately at a same temperature as section I, no light is reflected from the ULFBG in section II, and all the light is transmitted to section III. Section III includes the hotspot 412, and therefore has a different effective refractive index, causing the ULFBG in section III to reflect light with a wavelength $\lambda_2 \neq \lambda_1$ and preventing light with the wavelength of $\lambda_2$ from being transmitted to section IV. And again, because section IV is at approximately the same temperature as sections I and II, no light is reflected by the ULFBG in section IV. Thus, the reflected spectrum from the optical fiber includes light having the wavelengths of $\lambda_1$ and $\lambda_2$.

Returning to FIG. 1, as illustrated in FIG. 1, system 100 includes light source 130 and optical detector 140 optically coupled to the optical fiber 120. In some embodiments, the light source 130 may be a laser light source, a light-emitting diode (LED) light source, or any other suitable type of light source. The light source 130 may be configured to generate input light 132 that is provided to the optical fiber 120. For example, the light source 130 may be configured to generate input light 132 with multiple wavelengths (e.g., broad spectrum light). In some embodiments, the input light 132 may have multiple wavelengths centered around or near the Bragg wavelength of the optical fiber 120 at the operating temperature of the superconductor 110. In some embodiments, the light source 130 may be configured to generate input light 132 that is coherent.

In some embodiments, the optical detector 140 may be configured to detect the received light 142 that is reflected or transmitted by the gratings 122 of optical fiber 120. For example, the optical detector 140 may be configured to detect a spectrum of the received light 142 and/or to determine a peak wavelength of the received light 142. In some embodiments, the optical detector 140 may be an optical spectrum analyzer (OSA), an integrating sphere detector, a wavelength meter, or any other suitable optical detector.

In some embodiments, the optical detector 140 may be coupled to circuitry 150. Circuitry 150 may be configured to determine a temperature of the superconductor 110 based on the output of the optical detector 140. For example, circuitry 150 may be configured to receive an optical spectrum from the optical detector 140, to determine a peak wavelength of the received optical spectrum, and to determine a temperature corresponding to that peak wavelength. Circuitry 150 may be implemented using any suitable electronic circuitry, including but not limited to FPGA, ASIC, a microcontroller, and/or other microprocessing technologies.

In some embodiments, the system 100 includes computing system 170 communicatively coupled to the circuitry 150. The computing system 170 may be any suitable electronic device configured to receive information from the circuitry 150 and/or to process information received from the circuitry 150. In some embodiments, the computing system 170 may be a fixed electronic device such as a desktop computer, a rack-mounted computer, or any other suitable fixed electronic device. Alternatively, the computing system 170 may be a portable device such as a laptop computer, a smart phone, a tablet computer, or any other portable device that may be configured to receive information from circuitry 150 and/or to process information received from the circuitry 150.

In some embodiments, the circuitry 150 and the computing system 170 may be communicatively connected by an optional network 160. The network 160 may be or include one or more local- and/or wide-area, wired and/or wireless networks, including a local-area or wide-area enterprise network and/or the Internet. Accordingly, the network 160 may be, for example, a hard-wired network (e.g., a local area network within a facility), a wireless network (e.g., connected over Wi-Fi and/or cellular networks), a cloud-based computing network, or any combination thereof. For example, in some embodiments, the superconductor 110, optical fiber 120, light source 130, optical detector 140, and the circuitry 150 may be located within a same facility and connected directly to each other or connected to each other via the network 160, while the computing system 170 may be located in a remote facility and connected to the circuitry 150 through the network 160. It should be appreciated that in some embodiments, however, the computing system 170 may be connected directly to the circuitry 150 rather than being connected by the network 160, as aspects of the technology described herein are not limited in this respect.

In some embodiments, the computing system 170 may include a quench detection facility 172. The quench detection facility 172 may be configured to analyze data obtained by the optical detector 140 and processed by circuitry 150. The quench detection facility 172 may be configured to, for example, analyze the temperature data output by circuitry 150 to determine whether a quench event is about to occur and/or is presently occurring in the superconductor 110. For example, the quench detection facility 172 may be configured to determine whether the temperature data output by the circuitry 150 is greater than a threshold temperature value and/or to fit a function to the temperature data over time to determine whether a thermal runaway event is about to occur and/or is presently occurring.

In some embodiments, the computing system 170 may further include a quench mitigation facility 174. The quench mitigation facility 174 may be configured to generate instructions to cause the removal of energy from the superconductor 110 in response to a determination by the quench detection facility 172 of a quench event. For example, the quench mitigation facility 174 may be configured to generate instructions to cause a removal of current flowing in the superconductor 110 (e.g., by shunting or otherwise shorting the superconductor 110) to remove energy stored in the superconductor 110.

The quench detection facility 172 and/or the quench mitigation facility 174 may be implemented as hardware, software, or any suitable combination of hardware and software, as aspects of the technology described herein are not limited in this respect. As illustrated in FIG. 1, the quench detection facility 172 and the quench mitigation facility 174 may be implemented by the computing system 170, such as by being implemented in software (e.g., executable instructions) executed by one or more processors of the computing system 170. However, in other embodiments, the quench detection facility 172 and/or the quench mitigation facility 174 may be additionally or alternatively implemented at one or more other elements of the system 100. for example, the quench detection facility 172 and/or the quench mitigation facility 174 may be implemented at the circuitry 150. In other embodiments, the quench detection facility 172 and/or the quench mitigation facility 174 may be implemented at or with another device, such as a computing device located remotely from the system 100 and receiving data via the network 160.

Figure 5A:
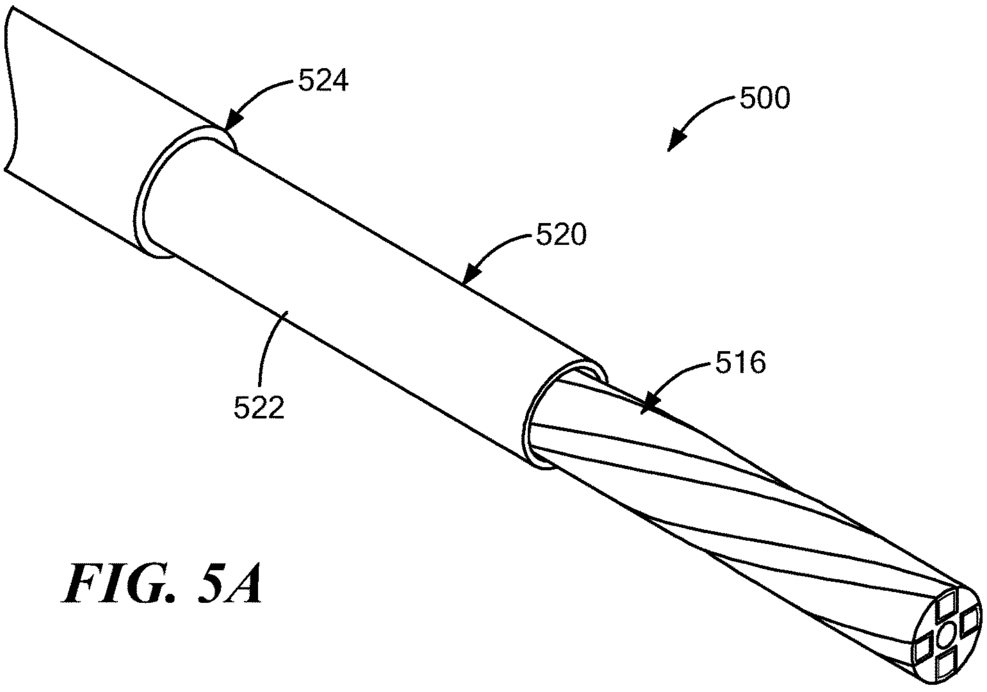
FIGS. 5A and 5B show views of a high-temperature superconductor (HTS) cable, in accordance with some embodiments described herein.

In the example of FIG. 1, superconductor 110 may correspond to HTS cables. As may be seen in FIGS. 5A and 5B, a HTS cable 500 includes a former 516 having HTS tape stacks 518 disposed in channels provided in an exterior surface of and extending along a length of the former 516. HTS tape stacks 518 are held in their respective channels via solder 519. An inner jacket 520 (e.g., a copper jacket) is disposed around the former 516 and HTS tape stacks 518 and a plating 522 (e.g., a silver plating) may be disposed over the inner jacket 520. Although the entire surface of inner jacket 520 may be plated, in some embodiments, only a portion of inner jacket 520 may be plated. Thus, as illustrated in FIG. 5A, only about one-half of the surface of inner jacket 520 has a plating 522 disposed thereover. An outer jacket 524 (e.g., a steel or stainless-steel jacket) is disposed around inner jacket 520.

In this example embodiment, the cable 500 has multiple channels in an electrically conductive (e.g., copper) former surrounded by one or more jackets. Each channel has an HTS tape stack and is filled with a metal (e.g., a solder). Cable 500 also includes an optional cooling channel 529.

Figure 5B:
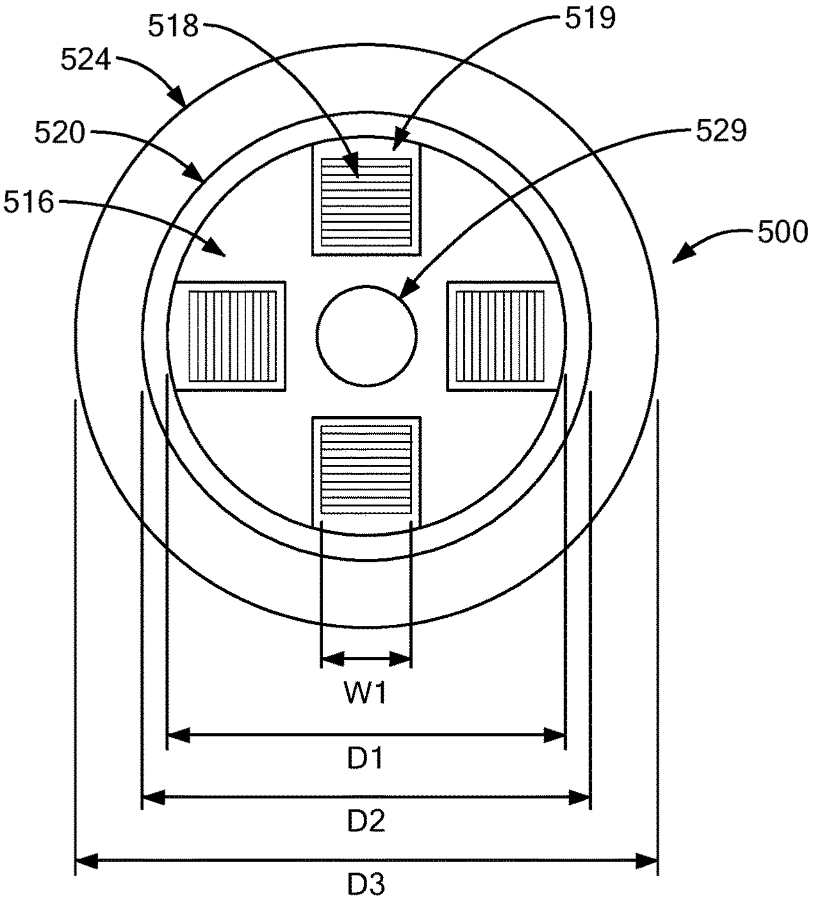

As shown in FIG. 5B, the width of an illustrative channel is W1, the diameter of the former 516 is D1, the diameter of the inner jacket 520 is D2, and the diameter of the outer jacket 524 is D3. In some embodiments, the inner jacket 520 may comprise copper and the outer jacket 524 may comprise stainless steel. However, this is merely by way of example, as other suitable materials for the jackets and former may be used.

Figure 6:
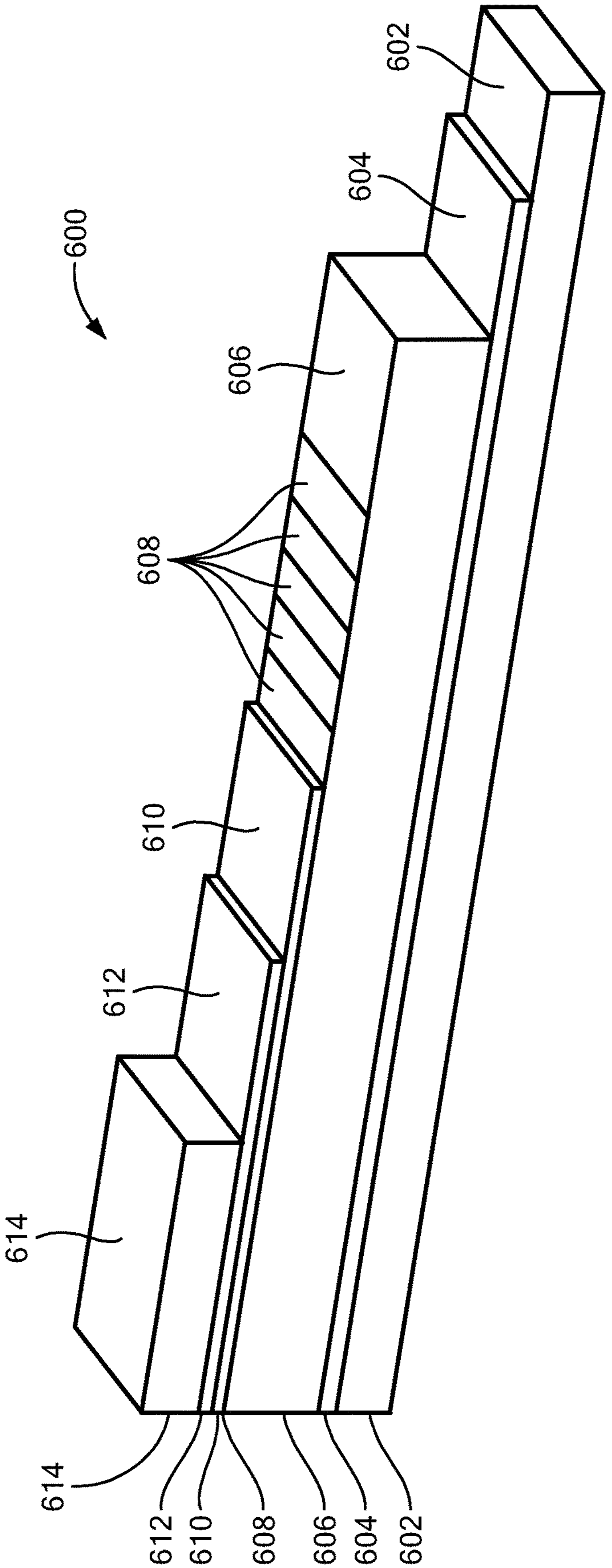
FIG. 6 is a perspective view of a HTS tape stack, in accordance with some embodiments described herein.

Referring now to FIG. 6, an illustrative HTS tape stack 600 includes a first layer 602 corresponding to a first stabilizer layer (here stabilizer layer 602 comprises copper). Disposed over layer 602 is an overlay layer 604 (here overlay 602 comprises silver). A substrate 606 is disposed over layer 604. In this example, substrate 606 may be provided from any suitable material and is provided having an electropolished surface. A buffer stack 608 is disposed over the substrate 606. In this example, buffer stack 608 may comprise one or more materials disposed via a magnetron sputtering technical. An HTS material 610 is disposed over buffer stack 608. In this illustrative embodiment, HTS material may comprise a rare earth barium copper oxide superconductor (REBCO) such as yttrium barium copper oxide (YBCO). Disposed over HTS material layer 610 is an overlayer 612 and disposed over overlay 612 is a second stabilizer layer 614. Overlayer 612 and stabilizer layer 614 may comprise the same materials as overlay 604 and stabilizer layer 602, respectively, as described above.

Figure 7B:
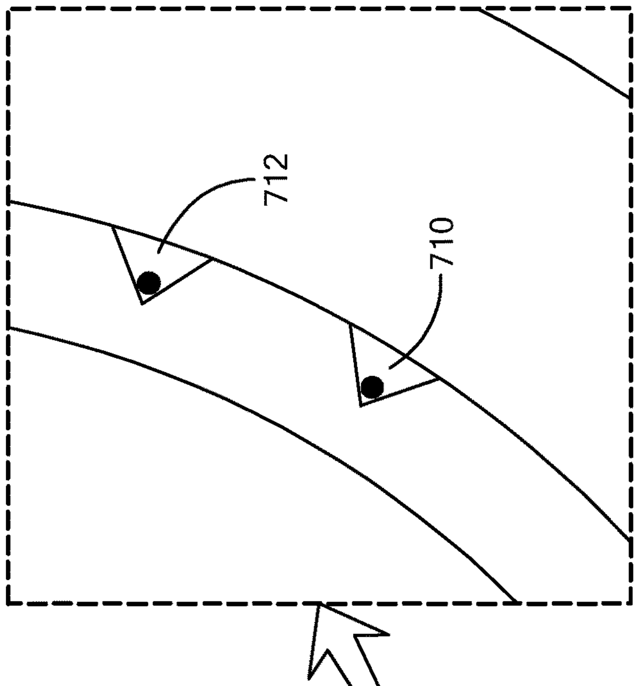
FIG. 7B is a close-up view of the optical fibers of FIG. 5C, in accordance with some embodiments described herein.
Figure 7A:
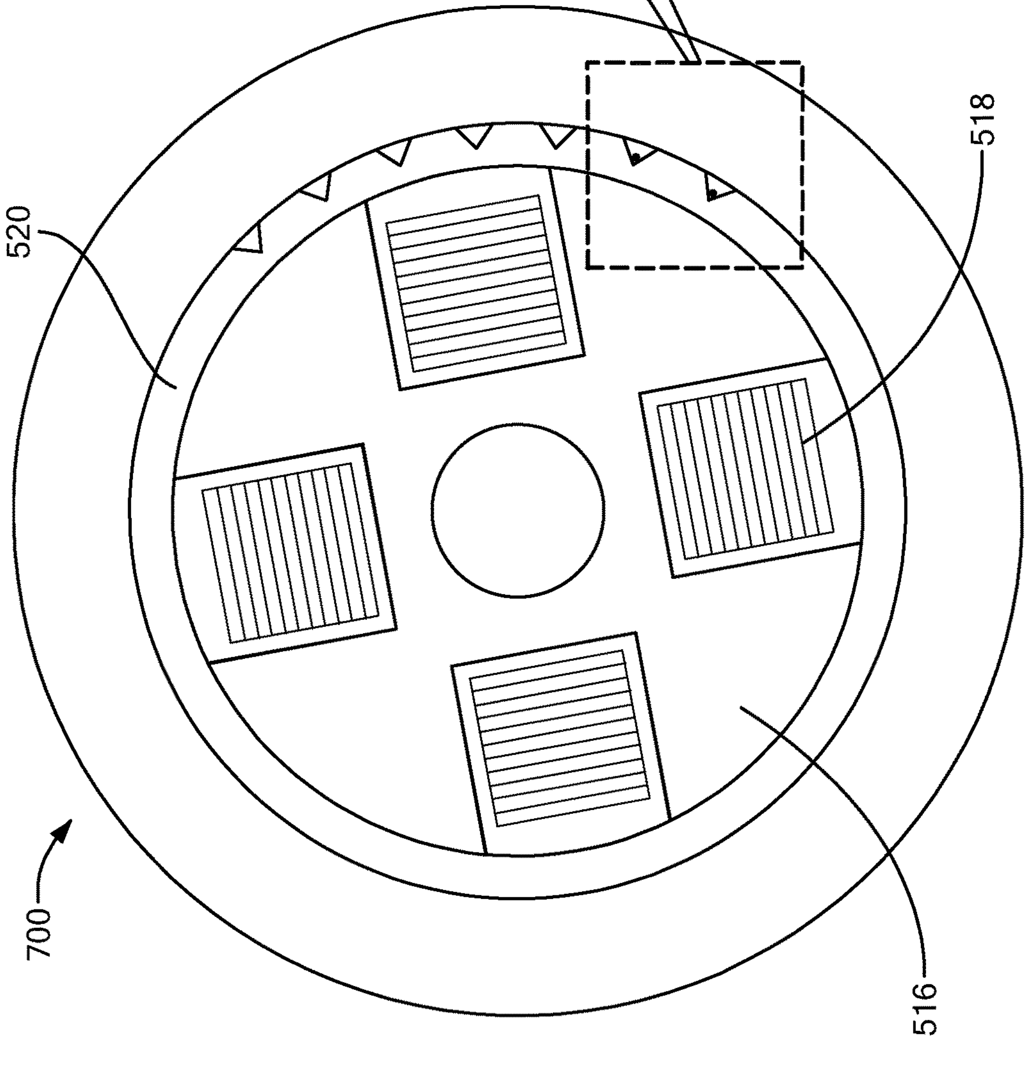
FIG. 7A is a cross-sectional view of a HTS cable including optical fibers for quench detection, in accordance with some embodiments described herein.

Referring now to FIGS. 7A and 7B, an HTS cable 700 may include one or more grooves 710 configured to accept optical fibers 712. As shown in FIGS. 7A and 7B, the grooves 710 may be disposed on an outer surface of the inner jacket 520 of the HTS cable 700. In some embodiments, the grooves 710 may be disposed in other surfaces of the HTS cable 700 (e.g., on an inner surface of the inner jacket 520, on an inner surface of the cooling channel 529).

The grooves 710 may extend along the length of the HTS cable 700, in some embodiments. The grooves may be disposed on one side of the HTS cable 700, as shown in the example of FIG. 7A. In some embodiments, the grooves 710 and optical fibers 712 may be arranged around a smaller or greater portion, including an entirety, of the circumference of the cable 700.

In some embodiments, the optical fibers 712 may be secured in the grooves 710 using an adhesive. For example, the optical fibers 712 may be secured in the grooves 710 using a thermally conductive adhesive (e.g., silver adhesive) to ensure thermal coupling between the optical fibers 712 and the former 516 and the HTS tape stacks 518.

An optical fiber 712 may be located at any position within or proximate the HTS cable 700. In some embodiments, the optical fibers 712 may be disposed on a surface of the HTS cable 700 rather than being disposed in grooves (e.g., grooves 710). For example, the optical fibers 712 may be adhered to any suitable surface (e.g., the outer or inner surface of the inner jacket 520, the inner surface of the cooling channel 529) of the HTS cable 700 using an adhesive (e.g., a thermally conductive adhesive).

Figure 8:
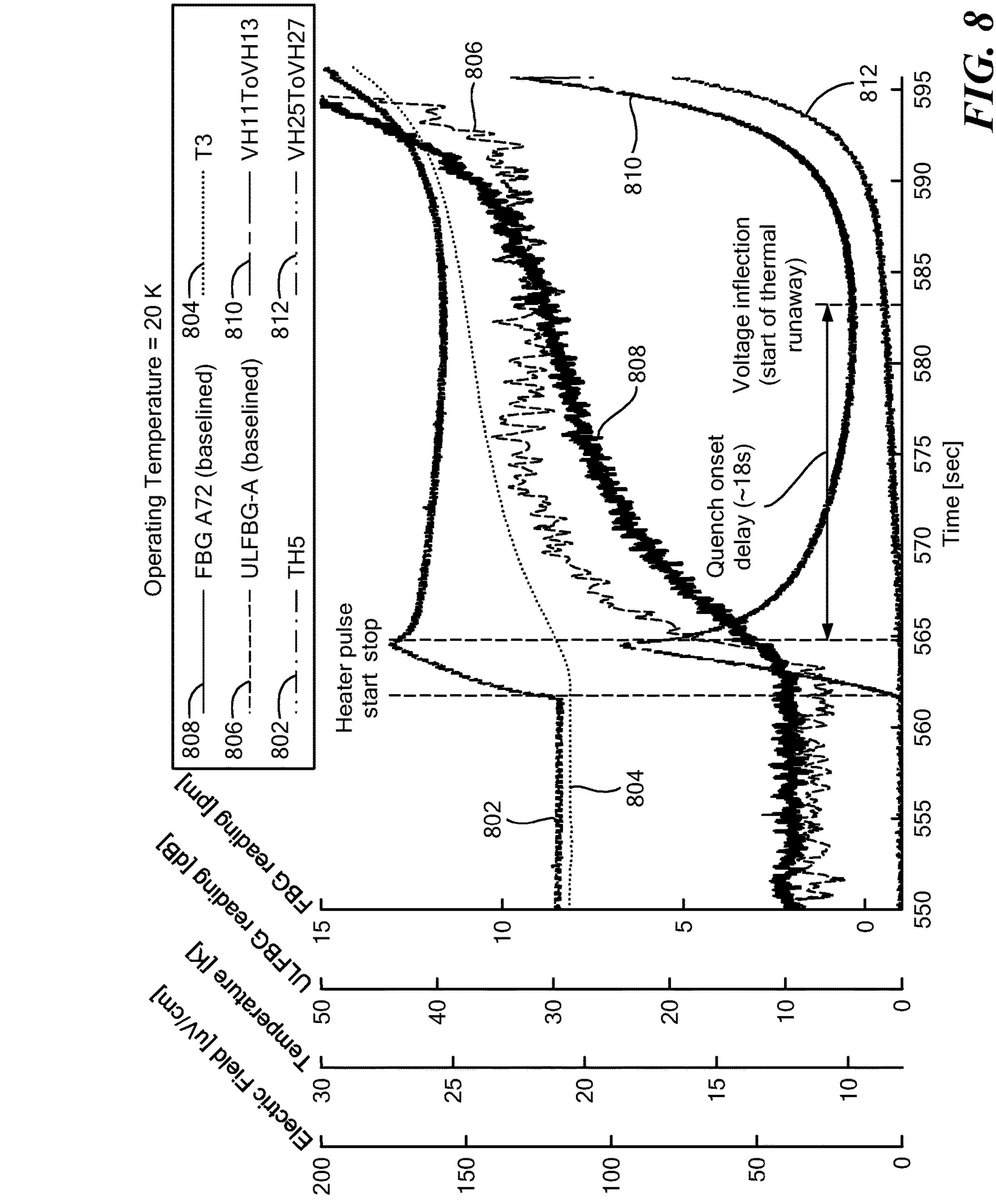
FIG. 8 is a plot illustrating FBG and ULFBG responses and voltage responses to applied heat causing a quench, in accordance with some embodiments described herein.

Referring now to FIG. 8, data collected from an experiment comparing an optical quench detection system and a voltage-based quench detection system is shown. Curve 802 shows the application of a heat pulse by a heater to a superconductor. The dashed vertical lines indicate the start (left) of the heat pulse application and the end (right) of the heat pulse application. Curve 804 shows the measured temperature at the site of the heat pulse application. Curves 806 and 808 show signals determined using optical fibers having ULFBGs and FBGs, respectively, while curves 810 and 812 are electrical measurements taken at different nodes of the superconductor. As can be seen from FIG. 8, curves 806 and 808 show a temporal response approximately the same as the electrical measurements of curve 810, indicating that optical quench detection is a robust and accurate technique to detect quench events in a superconducting material.

In some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application, for example as a software program application such as a fetal cardiac analysis facility.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 906 of FIG. 9 described below (i.e., as a portion of a computing device 900) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 9:
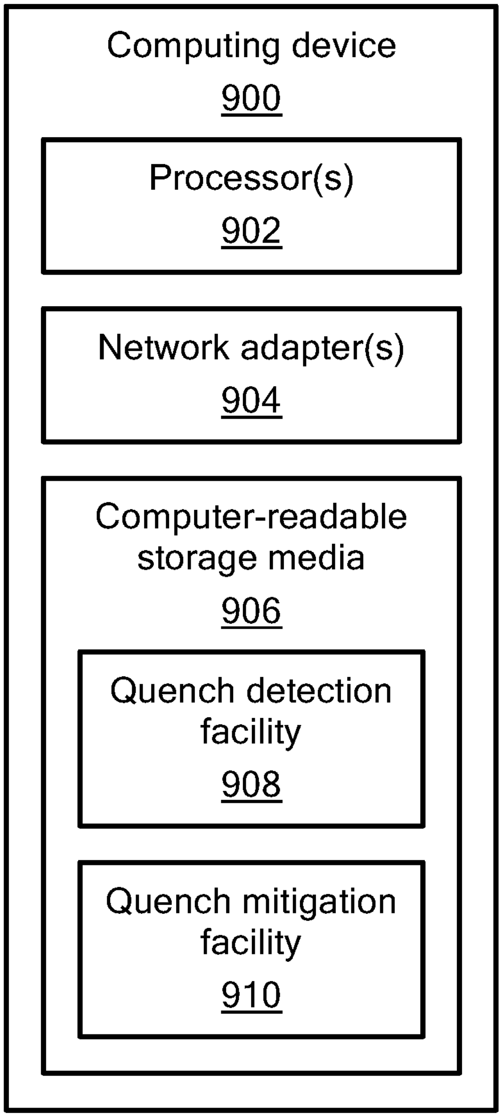
FIG. 9 is a schematic diagram of an illustrative computing device, in accordance with some embodiments described herein.

In some, but not all, implementations in which the techniques may be embodied as computer-executable instructions, these instructions may be executed on one or more suitable computing device(s) operating in any suitable computer system, including the exemplary computer system of FIG. 9, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

FIG. 9 illustrates one exemplary implementation of a computing device in the form of a computing device 900 that may be used in a system implementing techniques described herein, although others are possible. It should be appreciated that FIG. 9 is intended neither to be a depiction of necessary components for a computing device to operate as a quench detection system and/or a quench mitigation system in accordance with the principles described herein, nor a comprehensive depiction.

Computing device 900 may comprise at least one processor 902, a network adapter 904, and computer-readable storage media 906. Computing device 900 may be, for example, a desktop or laptop personal computer, a personal digital assistant (PDA), a smart mobile phone, or any other suitable computing device. Network adapter 904 may be any suitable hardware and/or software to enable the computing device 900 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store quench detection facility 908 configured to derive information indicative of a quench event from fiber optic thermometry data and/or quench mitigation facility 910 configured to cause the removal of stored energy from a superconducting material in the event that a quench event is detected.

While not illustrated in FIG. 9, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Having thus described several aspects of at least one embodiment of this technology, it is to be appreciated that various alterations, modifications, and improvements will readily occur to those skilled in the art.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

The invention claimed is:

1. A high temperature superconductor (HTS) cable, comprising:

at least one HTS tape stack extending along a length of the HTS cable;

an inner metal jacket surrounding the at least one HTS tape stack;

an outer metal jacket surrounding the inner metal jacket; and at least one optical fiber extending along the HTS cable, between the inner metal jacket and the outer metal jacket, the at least one optical fiber having a plurality of gratings spaced apart from one another along the length of the HTS cable to detect a quench of the at least one HTS tape stack.

2. The HTS cable of claim 1, wherein the inner metal jacket comprises copper.

3. The HTS cable of claim 1, further comprising at least one groove in an exterior surface of the inner metal jacket, wherein the at least one optical fiber is disposed within the at least one groove.

4. The HTS cable of claim 3, further comprising an adhesive in the at least one groove, securing the at least one optical fiber in the at least one groove.

5. The HTS cable of claim 1, further comprising a former, wherein the at least one HTS tape stack is within a groove in the former.

6. The HTS cable of claim 5, wherein the former comprises copper.

7. The HTS cable of claim 1, wherein the plurality of gratings are fiber Bragg gratings.

8. The HTS cable of claim 1, wherein gratings of the plurality of gratings are spaced apart from one another by a distance suitable for detecting quench within a short enough time period that current within the HTS cable can be reduced before damage to the HTS cable occurs.

9. A quench detection system for a high temperature superconductor (HTS) cable having at least one HTS tape stack extending along a length of the HTS cable, the quench detection system comprising:

an inner metal jacket surrounding the at least one HTS tape stack;

an outer metal jacket surrounding the inner metal jacket;

at least one optical fiber extending along the HTS cable, between the inner metal jacket and the outer metal jacket, the at least one optical fiber having a plurality of gratings spaced apart from one another along the length of the least one optical fiber;

a light source configured to illuminate the at least one optical fiber;

an optical detector configured to detect light from the at least one optical fiber; and circuitry configured to sense a temperature at one or more of the plurality of gratings using light detected by the optical detector.

10. The quench detection system of claim 9 used in at least one of: a fusion energy system, a magnetic resonance imaging system, a nuclear magnetic resonance system, a motor, a power transmission system, or a particle accelerator.

11. The quench detection system of claim 9, wherein the inner metal jacket comprises copper.

12. The quench detection system of claim 9, further comprising at least one groove in an exterior surface of the inner metal jacket, wherein the at least one optical fiber is disposed within the at least one groove.

13. The quench detection system of claim 12, further comprising an adhesive in the at least one groove, securing the at least one optical fiber in the at least one groove.

14. The quench detection system of claim 9, further comprising a former, wherein the at least one HTS tape stack is within a groove in the former.

15. The quench detection system of claim 9, wherein the plurality of gratings are fiber Bragg gratings.

16. The quench detection system of claim 9, wherein gratings of the plurality of gratings are spaced apart from one another by a distance suitable for detecting quench within a short enough time period that current within the HTS cable can be reduced before damage to the HTS cable occurs.

17. The HTS cable of claim 1, wherein the inner metal jacket and the outer metal jacket comprise dissimilar conductive metals.

18. The HTS cable of claim 17, wherein at least a portion of an exterior surface of the inner metal jacket is plated with a third dissimilar conductive metal.

19. The quench detection system of claim 9, wherein the inner metal jacket and the outer metal jacket comprise dissimilar conductive metals.

20. The quench detection system of claim 19, wherein at least a portion of an exterior surface of the inner metal jacket is plated with a third dissimilar conductive metal.

* * * * *